(12) United States Patent
Won

(10) Patent No.: US 7,269,436 B2
(45) Date of Patent: Sep. 11, 2007

(54) METHOD AND APPARATUS OF ALLOCATING POWER IN MULTIPLE-INPUT MULTIPLE-OUTPUT COMMUNICATION SYSTEM

(75) Inventor: Seung Hwan Won, Gwacheon-shi (KR)

(73) Assignee: LG Electronics Inc., Seoul (KR)

( * ) Notice: Subject to any disclaimer, the term of this patent is extended or adjusted under 35 U.S.C. 154(b) by 557 days.

(21) Appl. No.: 10/334,705

(22) Filed: Jan. 2, 2003

(65) Prior Publication Data
US 2003/0130003 A1   Jul. 10, 2003

(30) Foreign Application Priority Data
Jan. 4, 2002   (KR) .................................. 2002-418

(51) Int. Cl.
*H04B 7/00* (2006.01)
*H04Q 7/20* (2006.01)

(52) U.S. Cl. ............... 455/522; 455/115.1; 455/562.1; 342/372; 342/373

(58) Field of Classification Search ............... 455/454, 455/39, 450, 509, 69, 101, 103, 123, 522, 455/115.3, 562.1; 375/130; 342/371–373
See application file for complete search history.

(56) References Cited

U.S. PATENT DOCUMENTS

| | | | |
|---|---|---|---|
| 5,299,144 A * | 3/1994 | Bartkowiak et al. ........ 708/200 |
| 5,532,700 A * | 7/1996 | Lockwood .................. 342/378 |
| 6,380,910 B1 * | 4/2002 | Moustakas et al. ......... 343/893 |
| 6,600,772 B1 * | 7/2003 | Zeira et al. ................. 375/130 |
| 6,807,527 B1 * | 10/2004 | Rozhdestvenskij et al. . 704/223 |
| 2003/0003863 A1 * | 1/2003 | Thielecke et al. ............ 455/39 |
| 2003/0003880 A1 * | 1/2003 | Ling et al. .................... 455/92 |
| 2003/0125040 A1 * | 7/2003 | Walton et al. .............. 455/454 |
| 2004/0171385 A1 * | 9/2004 | Haustein et al. ............ 455/450 |

\* cited by examiner

*Primary Examiner*—Quochien B. Vuong
*Assistant Examiner*—Tuan H. Nguyen
(74) *Attorney, Agent, or Firm*—Ked & Associates, LLP

(57) ABSTRACT

A method and apparatus for allocating a power in a multiple-input multiple-output communication system is disclosed. A method of allocating power can include estimating a channel condition based on a reference signal received from a receiver, estimating power gains from the estimated channel condition, and determining respective power levels of transmission signals and a number of available antenna elements for the transmission signals by using the power gains.

23 Claims, 5 Drawing Sheets

90-percentile spectral efficiency with $M = 10$ transmit antennas and $N = 16$ receive antennas. Average SNR is 10 dB. Signal-to-Interference ratio is 0 dB.

METHOD AND APPARATUS OF ALLOCATING POWER IN MULTIPLE-INPUT MULTIPLE-OUTPUT COMMUNICATION SYSTEM

BACKGROUND OF THE INVENTION

1. Field of the Invention

The present invention relates generally to a mobile communication system, and more particularly to a method and an apparatus of allocating a power in a multiple-input multiple-output (MIMO) communication system.

2. Background of the Related Art

Generally, the multiple-input multiple-output MIMO system has been evolved from a conventional single-input single-output (SISO) communication system and a single-input multiple-output (SIMO) communication system. The MIMO system is used for a high-capacity data transmission. The MIMO system transmits information through M antennas and receives the information through N antennas, and is considered as an essential element in the fourth-generation communication system that requires a high efficiency of frequency.

FIG. 1 is a diagram illustrating a related art MIMO system. Referring to FIG. 1, a transmitter includes a transmission multiple-input multiple-output processor 101 for dividing an information source (or bit stream or data stream) into M sub-bit streams for signal processing, and a modulator 102 for modulating processed signals and applying modulated signals to M antennas. A receiver includes a demodulator 103 for receiving the signals transmitted from the transmitter through N antennas and demodulating the received signals, and a reception multiple-input multiple-output processor 104 for processing and restoring demodulated signals to the original information source (e.g., bit stream).

FIG. 2 is a diagram illustrating an example of a transmitter of a related art D-BLAST MIMO system. FIG. 3 is a diagram illustrating an example of a receiver of a related art D-BLAST MIMO system.

According to the MIMO system of FIGS. 2 and 3, the distance between antennas is 1.5λ, and four transmission and reception antennas are used. The MIMO system of FIGS. 2 and 3 is of a diagonal-bell labs' layered space-time (D-BLAST) type.

As shown in FIGS. 2 and 3, the bit stream to be transmitted is divided into M sub-bit streams of the same ratio by a demultiplexer 203, and the sub-bit streams are encoded in a signal processor 202. The encoded signals are periodically connected to the respective antennas by a tetrad cyclic shifter 201 for transmission to the receiver.

The signal processor 202 generates transmission signals having different transmission delays by modulating and encoding the respective bit streams of one information source, and applies the signals to the respective antennas. The signals transmitted through the antennas include the symbols encoded from the same information.

The cyclic shifter 201 periodically changes the connection of the transmission antennas to the signals processed from the sub-streams. For each τ seconds, the connection between the processed signals and the transmission antennas is periodically changed. This enables the transmitter to use a delay diversity technique, and M processed signals on fading channels are all received through the N receiving antennas. Since the M transmitted signals are received through all the receiving antennas, any one of the transmitted signals is received without being seriously affected by the worst channel environment when it passes through the multiple-paths environment.

Accordingly, the symbols that the received signals include are diagonally detected in respective space layers (discriminated by the receiving antennas) of a detector 301. That is, the desired symbol values are detected through cancelation of previously detected symbols from the received signals and nullification of the non-detected symbols. The process diagonally detects the desired symbol values as many times as the number of antennas.

The nullification enables the detection of the strongest signal by removing other weak signals. The cancelation enables the detection of the remaining weak signals by removing the previously detected signals from the original received signals.

Then, the detected symbols for each antenna are collected by a multiplexer 302, and generated as one data stream in the respective space layer, and the data streams of all the antennas are finally combined in the maximum ratio by a combiner 303. The maximum ratio combining type is for making the value of an output signal-to-interference ratio maximum by applying the respective channels to gains in proportion to square roots of the signal-to-interference ratios in the respective channels. The signal-to-interference ratios in the respective channels are added together to provide a whole signal-to-interference ratio.

FIG. 4 is a view illustrating another example of a transmitter of a related art V-BLAST MIMO system. FIG. 5 is a view illustrating an example of a receiver for receiving signals from the transmitter illustrated in FIG. 4.

According to the MIMO system of FIGS. 4 and 5, the distance between antennas is 4λ, and four transmission and reception antennas are used. The MIMO system of FIGS. 4 and 5 is of a vertical-bell labs' layered space-time (V-BLAST) type.

The MIMO system of FIGS. 4 and 5 has a similar construction to that of FIGS. 2 and 3. However, a signal processor 401 in FIG. 4 simplifies the decoding process by simply performing a vector encoding process for changing a bit to a symbol. The signal processor 401 modulates and encodes a plurality of sub-data streams divided from one information source. That is, M encoded symbols divided from the same information are transmitted through a plurality of antennas, respectively.

Also, a detector 501 arranges the M received symbols in the order of their levels of the signal-to-interference ratio, and detects a desired symbol from the symbols having a good receiving condition among the arranged symbols.

The frequency efficiency of the V-BLAST MIMO system used in FIGS. 4 and 5 is lower than that of the D-BLAST MIMO system used in FIGS. 2 and 3. However, the V-Blast MIMO system can be implemented using a more simplified receiving circuit.

That is, since the transmitted symbols in the D-BLAST MIMO system as shown FIGS. 2 and 3 may suffer a fatal error as passing through a multi-paths environment, an obstacle may arise when the receiver obtains the original information stream from the received symbols. Also, the construction of the receiver is complicated, and the channel coding is applied in a limited manner. However, the efficiency of the frequency use is heightened.

On the contrary, the V-BLAST MIMO system as shown in FIGS. 4 and 5 can be implemented using a simplified receiving circuit as an alternative, but the efficiency of the frequency use is degraded, and the distance between antenna elements should be widened. The wider distance between antenna elements is because the distance 10λ should be put between the antennas for no correlation between the antennas. For practical use, however, at least the distance of 4λ should be put between the antennas for no correlation (which corresponds to 80% of the case having no correlation).

As described above, the related art MIMO systems have various disadvantages. Further, there is a need for a MIMO system that improves efficiencies of the D-BLAST type system illustrated in FIGS. 2 and 3, and makes up for the weak points and problems in the V-BLAST type system illustrated in FIGS. 4 and 5.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide to a method and an apparatus of allocating a power in a multiple-input multiple-output (MIMO) communication system that substantially obviates one or more problems caused by limitations and disadvantages of the related art.

Another object of the present invention is to provide a method and an apparatus of allocating a power in a multiple-input multiple-output (MIMO) communication system having a low cost and high efficiency of communication resources.

At least the above and other objects and advantages of the present invention can be achieved in a whole or in part by providing a method of allocating a power in a multiple-input multiple-output (MIMO) communication system that includes estimating a channel condition based on a reference signal received from a receiver, estimating power gains from the estimated channel condition, and determining respective power levels of transmission signals and a number of available antenna elements for the transmission signals by using the power gains.

To further achieve at least the above objects and advantages in a whole or in part, according to an aspect of the present invention, there is provided an apparatus of allocating a power in a multiple-input multiple-output communication system that includes an estimator configured to estimate a channel condition based on a reference signal received from a receiver and configured to estimate power gains from the estimated channel condition, and a determiner configured to determine respective power levels of transmission signals and a number of available antenna elements for the transmission signals by using the power gains.

Preferably, embodiments can divide an estimated channel covariance matrix into a unit component and a first diagonal component, arithmetically operate the first diagonal component and a hermitian component of the first diagonal component, and estimates a second diagonal component of the arithmatically operated component as the eigenvalues.

To further achieve at least the above objects and advantages in a whole or in part, according to an aspect of the present invention there is provided an apparatus for allocating power in a multiple-input multiple-output communication system that includes unit for estimating a channel condition based on a reference signal received from a receiver and estimating power gains from the estimated channel condition, and unit for determining respective power levels of transmission signals and a number of available antenna means for transmitting the transmission signals responsive to the power gains.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Embodiments according to the present invention teach a MIMO transmission/reception system that uses a high efficiency of frequency and a narrow transmission antenna distance. Thus, embodiments according to present invention can provide advantages of the D-BLAST, and simultaneously supplement disadvantages of the V-BLAST type systems.

Figure 1:
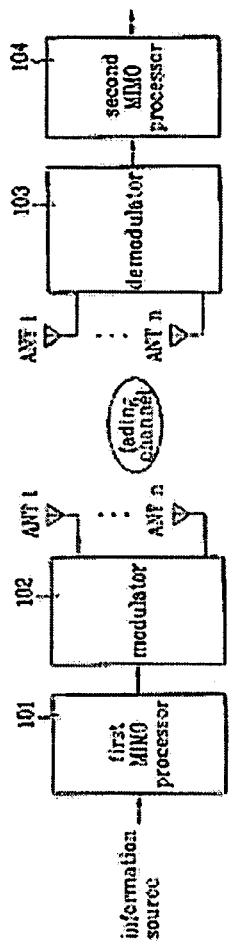
FIG. 1 is a diagram illustrating an example of a related art MIMO system.
Figure 2:
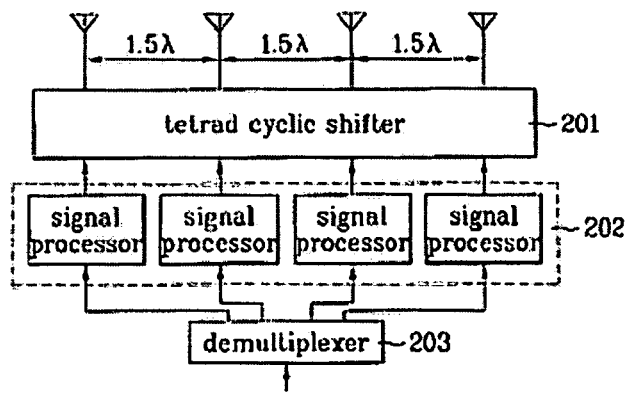
FIG. 2 is a diagram illustrating an example of a related art transmitter of a D-BLAST MIMO system.
Figure 3:
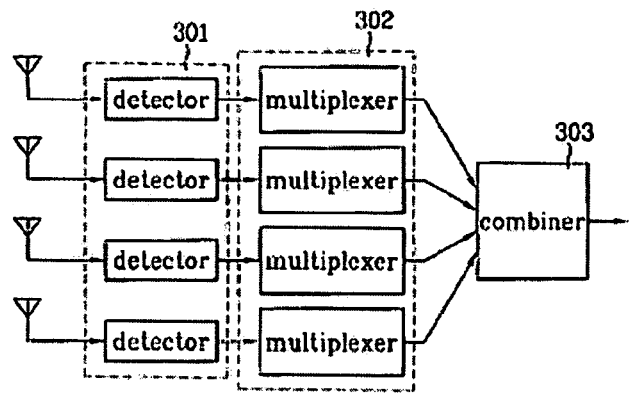
FIG. 3 is a diagram illustrating an example of a related art receiver for receiving signals from the transmitter illustrated in FIG. 2.
Figure 4:
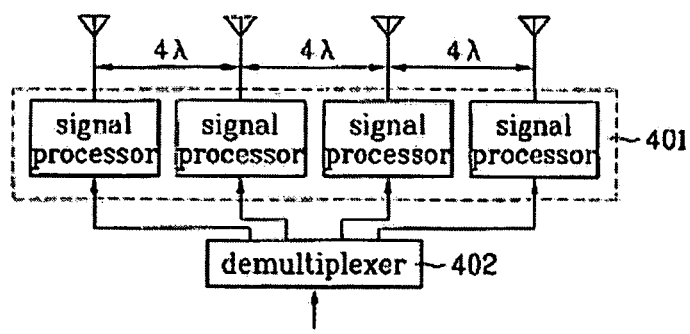
FIG. 4 is a diagram illustrating another example of a related art transmitter of a V-BLAST MIMO system.
Figure 5:
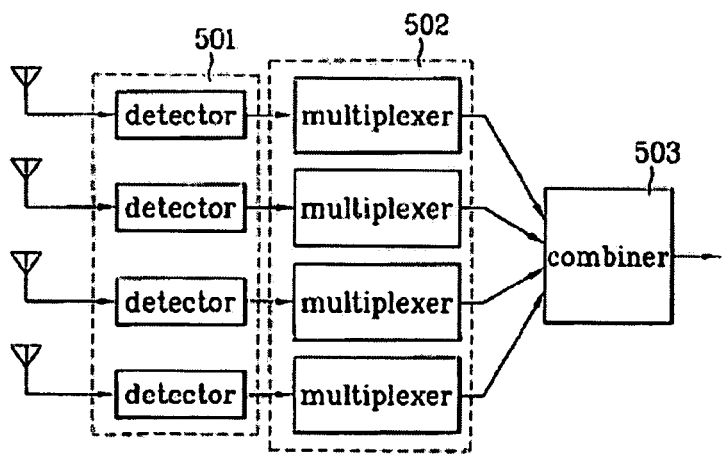
FIG. 5 is a diagram illustrating an example of a related art receiver for receiving signals from the transmitter illustrated in FIG. 4.
Figure 6:
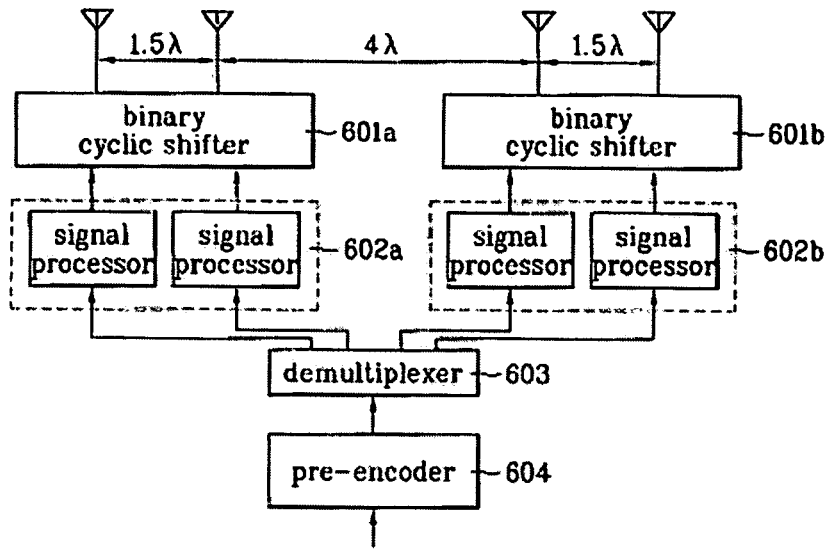
FIG. 6 is a diagram illustrating a transmitter of a MIMO system according to a preferred embodiment of the present invention.
Figure 7:
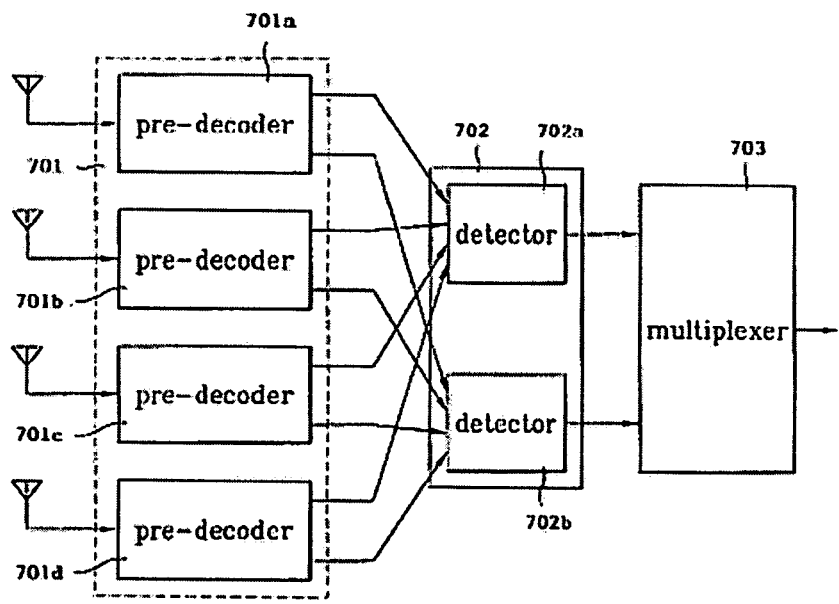
FIG. 7 is a diagram illustrating a first example of a receiver for receiving signals from the transmitter of FIG. 6.

FIG. 6 is a diagram illustrating a transmitter of a MIMO system according to a first embodiment of the present invention. As shown in FIG. 6, the first embodiment includes four antenna elements, however, the present invention is not intended to be so limited. FIG. 7 is a diagram illustrating an exemplary receiver configured to receive signals from the transmitter of FIG. 6.

As shown in FIGS. 6 and 7, a number of transmission antenna elements can be the same as that of reception antenna elements, for example, four antenna elements can be used, respectively. Also, a D-BLAST transmitter having at least two antenna elements is preferably considered as a constituent unit. Further, at least two such constituent units can preferably constitute a V-BLAST system according to embodiments. That is, a plurality of antenna elements can be divided into N constituent units according to locations of the plurality of antenna elements. Herein, a distance between two antenna elements of each constituent unit is preferably greater than 1.5 times of a wavelength of the transmitting signal. A distance between two antenna elements that belongs to two different constituent units, respectively, is preferably greater than 4 times of a wavelength of the transmitting signal.

For example, as shown in FIGS. 6 and 7, the distance between the antenna elements in the D-BLAST system can be 1.5λ in the same manner as the related art system. Also, a D-BLAST transmitter can be considered as a constituent unit of the V-BLAST MIMO system, and the antenna distance of a plurality of D-BLAST transmitters that constitute the V-BLAST MIMO system can be 4λ in the same manner as the related art system. That is, in an exemplary case of arranging four antenna elements to implement the V-BLAST MIMO system, the related art system requires 12λ, but a system according to embodiments of the present invention can require only 7λ.

As shown in FIG. 6, a pre-encoder 604 can add a header, an indicator or the like for discriminating antenna elements of the D-BLAST constituent unit to an input data stream preferably at its regular intervals. The header or the indicator can be used for discriminating the respective antenna elements of D-BLAST units of the transmitter when a receiver receives signals through the receiving antenna elements. For example, the pre-encoder 604 can add a header or an indicator to each of the M sub-data streams divided from the data stream. At this time, the transmitter preferably doesn't use a separate pilot channel when transmitting the data stream, but the header can include pilot symbols. The receiver receiving the signals generated from the sub-data streams can detect the respective headers of the received signals and determine an antenna element through which a corresponding signal is transmitted.

A demultiplexer 603 can divide the data stream into M sub-data streams including the headers or indicators respectively, and provides the divided sub-data streams to signal processors 602a and 602b where M can correspond to a number of the D-BLAST constituent units. At this time, each signal processor 602a and 602b is preferably provided with one or at least two sub-data streams including same information. The two signal processors 602a and 602b can be arranged in parallel to encode and modulate the provided sub-data streams.

Each binary cyclic shifter 601a and 601b can shift the M/2 modulated signals in the same D-BLAST constituent unit to the respective antenna elements to transmit the signals to the receiver. For example, the shifter 601a or 601b preferably shifts the M/2 modulated signals in the same D-BLAST constituent unit per 1 symbol interval. Therefore, the M/2 modulated signals in the same D-BLAST constituent unit can include the same information, different transmission delays, and different pilot symbols.

FIG. 7 is a diagram illustrating an embodiment of a receiver according to the present invention for receiving signals from the transmitter of FIG. 6. As shown in FIG. 7, for example, a pre-decoder 701a can recognize the headers, identifiers or the like of signals received through the antenna elements. For the process, the pre-decoder 701a can estimate a channel vector of each of the received signals. A nulling vector of the channel vector can be used to null undesired symbols (e.g., interference and noise signal) of the received signals. The pre-decoder 701a can provide the estimated channel vector and the corresponding received signal to selectively coupled detector 702a or 702b according to a type of the channel vector. Likewise, other pre-decoders 701b, 701c, and 701d can do the same according to a type of the channel vector. Accordingly, signals from transmitting antenna elements of a same constituent unit can be provided to a same detector. Each of detectors 702a and 702b can sequentially detect desired symbols using the channel vector and the received signals. For example, one detector 702a can detect x0 and x1 using the channel vectors and received signals provided by the pre-decoders 701. The detector 702a can combine the x0 and x1 in the improved or maximum ratio and output x. The other detector 702b can detect y0 and y1 using the channel vectors and received signals, combine the y0 and y1 in the improved or maximum ratio and output y. A multiplexer 703 can preferably multiplex the x and y in one symbol sequence xy.

Figure 8:
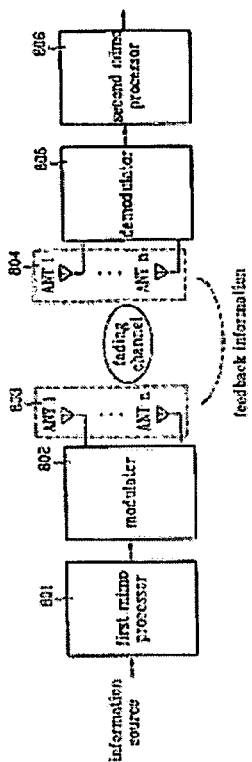
FIG. 8 is a diagram illustrating construction of a closed loop hybrid MIMO system according to another embodiment of the present invention.

FIG. 8 is a diagram illustrating a closed loop hybrid MIMO system according to a second embodiment of the present invention. As shown in FIG. 8, the closed loop hybrid MIMO system can include a first MIMO processor 801 for processing the information source to provide signals having different transmission times, a modulator 802 for modulating the signals having the different transmission times, a plurality of first antennas 803 for transmitting the modulated signals to a receiver and a plurality of second antennas 804 for receiving the transmitted signals. The closed loop hybrid MIMO system can further include a demodulator 805 for demodulating the received signals and a second MIMO processor 806 for processing the demodulated signals corresponding to the different transmission times.

The second MIMO processor 806 can provide feedback information for the power control of the transmitter to the transmitter in the closed loop hybrid MIMO system.

The closed loop hybrid MIMO system can us the following power control. First, the power control of the signals provided to the transmission antenna pair for transmitting the signals having the different transmission delays is preferably performed in the same manner. Second, the channel condition evaluation is preferably performed by a weighted sum. Third, the separate power control is preferably performed if there is only a pair of transmission antennas having the different transmission delays with respect to the signal having the same header (e.g., the signals have the same header when generated from the same information bit stream).

In an embodiment of the closed loop hybrid MIMO system according to the present invention, the power allocation method according to the channel condition can use a power allocation algorithm based on a water-filling theorem applied to the related art closed loop V-BLAST system. However, the transmitting types in the hybrid MIMO systems according to the related art system and embodiments according to the present invention are different from each other, and because of such differences, control of the number of transmission antennas according to embodiments of the present invention is different from that according to the related art system.

Generally, to obtain an increased or a maximum communication capacity, the transmitter should know a covariance matrix of a channel and a channel noise, and the covariance value of the transmitted signal should be properly adjusted. Accordingly, it is necessary for the transmitter to obtain an eigenvalue of the channel covariance matrix under the channel noise in order to transmit the independent multiple transmission data streams to the receiver.

If this eigenvalue($\lambda$) is known, the power can be allocated based on the eigenvalue obtained according to the optimum water-filling theorem using the whole transmission power. The water-filling algorithm is a rule for obtaining a maximum communication capacity, and shows to what values the maximum communication capacity of the respective channels can be filled up as the following Equation 1.

$$\frac{1}{\lambda_1} + P_1 = \ldots = \frac{1}{\lambda_i} + P_i, \sum P_i = CONST \qquad (1)$$

In Equation 1, "CONST." can be represented as the whole power, and shows that the channel having the biggest gain has the biggest power. By summing amounts of partial powers of the respective channels is obtained a value determined in "CONST.".

From the above, the relation between the eigenvalue of the channel covariance matrix can be obtained from a 'singular value decomposition,' and the power can be known. Also, it can be known that a method for increasing or maximizing the communication capacity with a limited input power is presented.

The eigenvalue can be obtained using the channel covariance matrix that is all information of channel response characteristics of the transmitter, and then the number of transmission antennas and the allocated power level may be determined using the number and size of the obtained eigenvalues. The number of obtained eigenvalue can correspond to the number of antennas required for the transmission, and the size of the eigenvalues can represent the power gain. Accordingly, the power can be allocated according to the size of the eigenvalue. As the power gain becomes larger, the allocated power level becomes larger. On the contrary, as the power gain becomes smaller, the allocated power level becomes smaller.

Also, if the transmission capacity of the channel determined according to the water-filling theorem is small, the signal is transmitted with a small power level allocated. However, in case that the transmission capacity of the channel is large, the signal is transmitted with the power level corresponding to the eigenvalue allocated in addition.

For example, the transmitter can estimate the channel covariance matrix (e.g., the change of the channel for each burst unit (normally, size of 100 symbols)) using a preamble or midamble transmitted from the receiver. The transmitter can also update the number of antennas and the power allocation according to the eigenvalues of the estimated covariance matrix and the size of the eigenvalues.

Embodiments according to the present invention disclose a V-BLAST type transmission structure that can include D-BLAST constituent units each of which can basically be composed of at least two transmission antennas (e.g., whereby signals generated from the same information sources are transmitted with different transmission delay times) and a receiving structure for the transmission structure. Consequently, embodiments of the V-BLAST type transmission structure according to the present invention preferably include even-numbered antennas.

Accordingly, the even-numbered available antennas should be requested, and the number of available antennas is preferably determined by the differences of the calculated eigenvalues (or power gains or the like). The power level can be determined according to the eigenvalues that are preferably calculated using the water-filling theorem.

As an exception, determination of odd-numbered antennas can be requested, and in the worst case, the signal is transmitted through one antenna. This case can correspond to a single-input multiple-output (SIMO) system, and its performance becomes identical to that of the phased array system as shown in FIG. 9.

Figure 9:
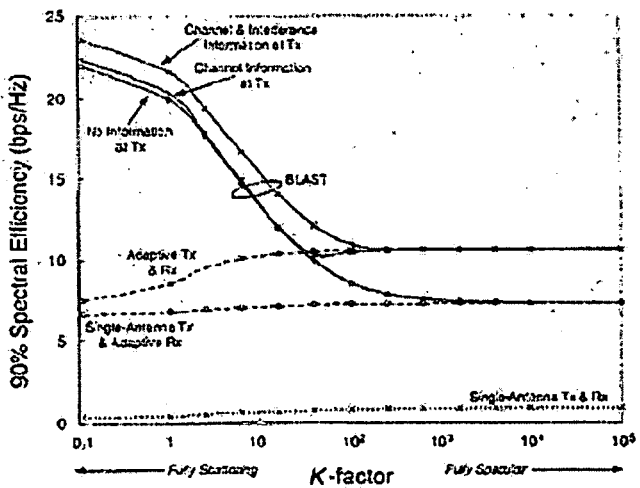
FIG. 9 is a graph illustrating a correlation degree of channels.

FIG. 9 is a graph illustrating a correlation degree of channels. FIG. 9 illustrates a spectral efficiency relation according to a value of k.

A channel matrix H is divided into a line-of-sight component and a non-line-of-sight component, and the channel matrix can be represented as the following equation 2.

$$H = \sqrt{\frac{k}{k+1}} H^{SP} + \sqrt{\frac{1}{k+1}} H^{SC} \qquad (2)$$

In equation 2, "$H^{SP}$" represents the line-of-sight component (e.g., component having correlation), and "$H^{SC}$" represents the non-line-of-sight component (e.g., component having no correlation). Also, "k" represents the ratio of the line-of-sight component to the non-line-of-sight component. As shown in FIG. 9, the correlation degree of the channels is represented with the k factor, and the relation among the spectrum efficiencies according to the respective k are illustrated.

As described below, a number of antennas in embodiments can vary based on the difference of the eigenvalues reflecting the channel condition and the power allocation. The desired or optimum threshold values should be set in a different manner according to criteria including the environment (e.g., indoors or outdoors) and the number of antennas of the transmitting system. Accordingly, they can be set by simulations and actually measured values.

Figure 10:
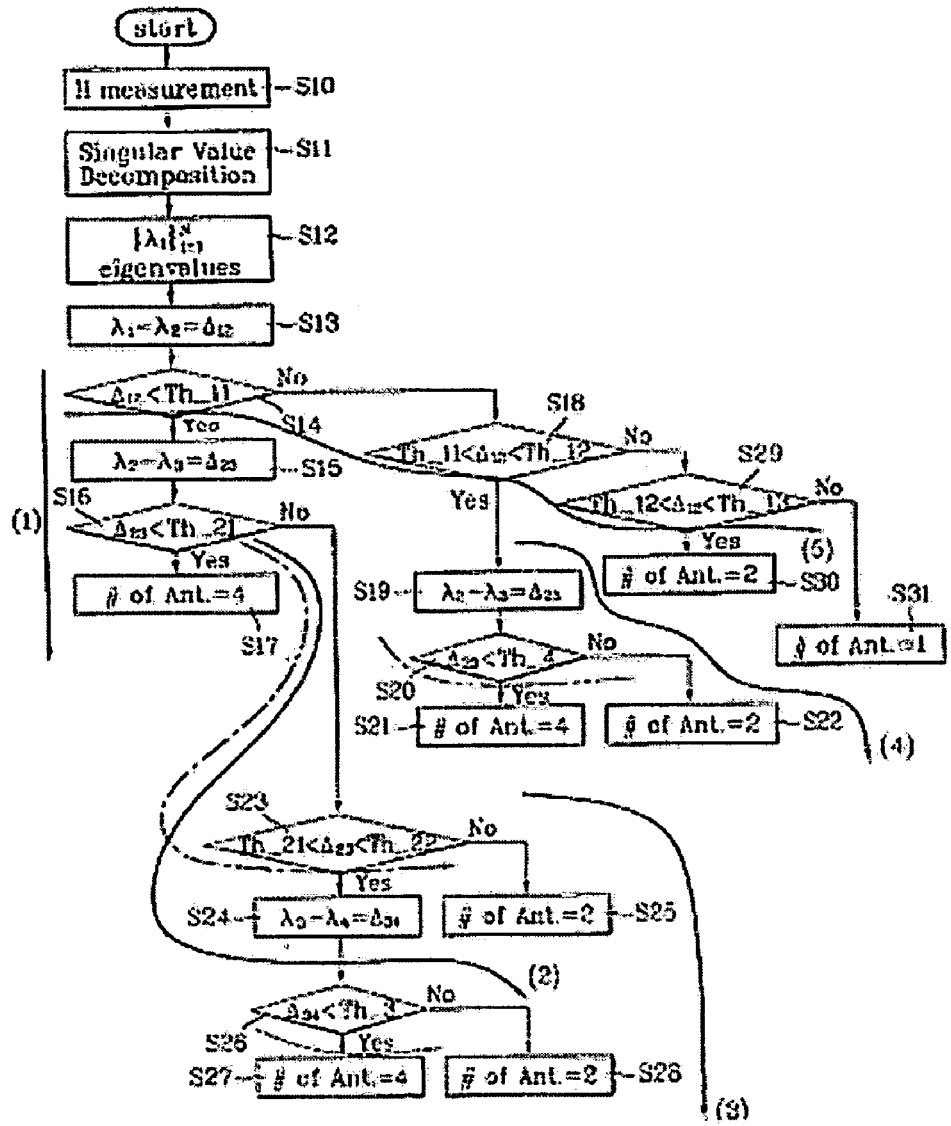
FIG. 10 is a diagram illustrating a power allocation procedure according to a still another embodiment of the present invention.

FIG. 10 is a diagram illustrating an embodiment of a power allocation procedure according to the present invention. As shown in FIG. 10, after beginning, the channel matrix (e.g., channel covariance matrix) H is estimated for the unit of a burst (e.g., normally, the size of 100 symbols) using a reference signal (e.g., a pilot sequence used as a training sequence, preamble, or midamble (e.g., pilot pattern)) transmitted from the antennas of the receiver (step S10). This is one method of estimating the channel condition.

Also, using a singular value decomposition (step S11), the eigenvalues $\lambda_i$, i=1~N of the channel matrix can be obtained (step S12). Preferably, the estimated channel matrix is dissolved into two unit matrices and a diagonal matrix. Then, the diagonal matrix is multiplied by a complex conjugate transpose matrix of the diagonal matrix. Herein, the diagonal components of the multiplied diagonal matrix will be the eigenvalues.

Since a difference of the respective eigenvalues preferably relates to the value of the power gain, the difference values $\lambda_j - \lambda_{j+1} = \Delta_{j, j+1}$, j=1~N−1 of the eigenvalues $[\lambda]_i^N = 1$ are calculated and compared (steps S13, S14, S18, and S29). Preferably, if a first eigenvalue difference $\Delta_{12}$ is less than TH_11 or is greater than TH_11 but less than TH_12, a second eigenvalue difference $\Delta_{23}$ is calculated (steps S15 and S19).

If $\Delta_{23}$ is less than TH_21 and TH_4 (steps S16 and S20), it is preferably directly judged that four antennas are being used (steps S17 and S21). But if $\Delta_{23}$ is greater than TH_4, it is preferably judged that two antennas are being used (step S22). Additionally, in the step 16, if $\Delta_{23}$ is greater than TH_21 but less than TH_22, another eigenvalue difference $\Delta_{34}$ is preferably calculated (step S24). In the step S23, if $\Delta_{23}$ is greater than TH_22, it is preferably directly judged that two antennas are being used (step S25). If the calculated $\Delta_{34}$ is less than TH_3 (step S23), it is preferably judged that four antennas are being used (step S27), but if $\Delta_{34}$ is greater than TH_3, two antennas are being used (step S28). Meanwhile, if $\Delta_{12}$ is greater than TH_12 but less than TH_13 (step S29), it is preferably judged that two antennas are being used (step S30). But if $\Delta_{12}$ is greater than TH_13, it is preferably judged that one antenna is being used (step S31).

As shown in FIG. 10, a first path preferably shows to allocate antenna elements to be required where each difference of channel gains between channels based on the channel matrix can be relative small. That is, that $\Delta_{12}$ is less than TH_11 and $\Delta_{23}$ is less than TH_21 indicates that the channel conditions of four channels are similar one another.

A second path preferably shows to allocate antenna elements to be required where channel conditions of at least two antenna elements belonging to each D-BLAST constituent unit are similar each other. At this time, power levels of signals which are transmitted through at least two antenna elements belonging to each D-BLAST constituent unit are different each other.

A third path preferably shows to allocate antenna elements to be required where channel conditions of at least two antenna elements belonging to a first D-BLAST constituent unit are similar each other, but a difference of a channel condition between the first D-BLAST constituent units and a second D-BLAST constituent unit is great. At this time, it is determined that at least two antenna elements of one D-BLAST constituent unit are used to transmit the signals.

A fourth path preferably shows to allocate antenna elements to be required where a channel condition of one channel is dominant, but channel conditions of other channels are similar one other. Even though a channel condition of one channel is dominant, it is also determined that at least two antenna elements of one D-BLAST constituent unit are used to transmit the signals. If the dominant channel condition is acceptable scope, it may be also determined that four antenna element are used to transmit the signals.

A fifth path preferably shows to allocate antenna elements to be required where a channel condition of one channel is just dominant. At this time, as the channel condition of the one channel meets a lower bound in a phase array antenna, it is determined that one antenna element is used to transmit one signal.

In summary, according to embodiments of the present invention, since the constituent or minimum transmission unit is the D-BLAST constituent unit, two antenna elements transmit the same data stream. Thus, the power can be allocated based on the water-filling theorem or the like in accordance with the power gain according to the size of the eigenvalue where the number of useable antennas is a certain even number.

As described above, preferred embodiments of the present invention have various advantages.

First, using the composite system of D-BLAST and V-BLAST, the antenna distance is greatly reduced and the frequency efficiency becomes better in comparison to a related art V-BLAST system. Second, the deterioration degree of performance of the MIMO system that is produced when the channel condition is changed from the non-correlation condition to the correlation condition because of the change of the channel continuously changed can be reduced or mitigated through the receiving gain obtained from the effect of the diversity. Third, by reflecting the channel environment continuously changed, the deterioration degree of performance of the MIMO system that is produced when the channel condition is changed from the non-correlation condition to the correlation condition because of the change of the channel continuously changed can be reduced or mitigated through the construction of a closed loop and proper power allocation, and at the worst, performance criteria can becomes approximately identical to that of the phased array system. Fourth, as the correlation of the channels becomes greater, the performance deterioration can be increasingly compensated or greater offset in comparison to the open loop system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of controlling transmission power in a multi-input multi-output (MIMO) communications system having a plurality of transmission antennas, comprising:
   estimating a channel covariance matrix based on a reference signal received from a receiving side;
   obtaining eigenvalues of the channel covariance matrix; and
   determining a number of antennas for transmitting signals to the receiving side among the plurality of transmission antennas and power level to be allocated to each antenna based on the eigenvalues; wherein obtaining the eigenvalues comprises:
   dividing the estimated channel covariance matrix into a unit component and a first diagonal component;
   multiplying the first diagonal component and a hermitian component of the first diagonal component; and
   determining a second diagonal component of the multiplied component as the eigenvalues.

2. The method of claim 1, wherein the number of eigenvalues is determined as the number of the antennas and the power level is allocated to said each antenna according to a size of a corresponding eigenvalue.

3. The method of claim 2, wherein a greater amount of the power level is allocated to an antenna having a greater size of eigenvalues.

4. The method of claim 1, wherein the reference signal is one of a pilot signal, a preamble, and a midamble.

5. The method of claim 1, wherein the power levels of signals having different transmission delays and being generated from the same information are substantially identical.

6. The method of claim 1, wherein the number of the antennas is increased or decreased by even numbers.

7. The method of claim 1, wherein the plurality of transmission antennas are grouped into at least one antenna group.

8. The method of claim 7, wherein the number of the antennas is determined by a unit of an antenna group.

9. The method of claim 8, wherein at least one antenna group for transmitting signals is determined based on differences between the eigenvalues.

10. The method of claim 9, wherein all antenna groups are determined to transmit signals to the receiving side, if differences between every two eigenvalues are less than a predetermined reference value.

11. The method of claim 10, wherein a part of antenna groups is determined to transmit signals to the receiving side, if a difference between at least two eigenvalues is greater than the predetermined reference value.

12. The method of claim 9, wherein a V-BLAST scheme is adapted to between antenna groups and a D-BLAST scheme is adapted to between antennas belonging to each antenna group.

13. An apparatus for transmitting signals using a plurality of antennas in a multi-input multi-output (MIMO) communications system, comprising:
  means for estimating a channel covariance matrix based on a reference signal received from a receiving side;
  means for obtaining eigenvalues of the channel covariance matrix; and
  means for determining a number of antennas for transmitting signals to the receiving side among the plurality of antennas and power level to be allocated to each antenna based on the eigenvalues, wherein the means for obtaining eigenvalues comprises:
    means for dividing the estimated covariance matrix into a unit component and a first diagonal component;
    means for multiplying the first diagonal component and a hermitian component of the first diagonal component; and
    means for determining a second diagonal component of the multiplied component as the eigenvalues.

14. The apparatus of claim 13, wherein the number of eigenvalues is determined as the number of the antennas and the power level is allocated to each antenna according to a size of corresponding eigenvalues.

15. The apparatus of claim 14, wherein a greater amount of the power level is allocated to an antenna having a greater size of eigenvalues.

16. The apparatus of claim 14, wherein an identical power level is allocated to signals having different transmission delays and being generated from the same information.

17. The apparatus of claim 13, wherein the number of the antennas is increased or decreased by even numbers.

18. The apparatus of claim 13, wherein the plurality of antennas are grouped into at least one antenna group.

19. The apparatus of claim 18, wherein the number of the antennas is determined by a unit of an antenna group.

20. The apparatus of claim 19, wherein at least one antenna group for transmitting signals is determined based on differences between the eigenvalues.

21. The apparatus of claim 20, wherein all antenna groups are determined to transmit signals to the receiving side, if differences between every two eigenvalues are less than a predetermined reference value.

22. The apparatus of claim 20, wherein a part of antenna groups is determined to transmit signals to the receiving side, if a difference between at least two eigenvalues is greater than the predetermined reference value.

23. The apparatus of claim 18, wherein a V-BLAST scheme is adapted to between antenna groups and a D-BLAST scheme is adapted to between antennas belonging to each antenna group.

* * * * *